(12) United States Patent
Ramanathan

(10) Patent No.: US 7,603,266 B2
(45) Date of Patent: Oct. 13, 2009

(54) GENERIC EMULATOR OF DEVICES IN A DEVICE COMMUNICATIONS PROTOCOL

(75) Inventor: Govindaraj Ramanathan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 369 days.

(21) Appl. No.: 10/676,350

(22) Filed: Sep. 30, 2003

(65) Prior Publication Data

US 2005/0066086 A1 Mar. 24, 2005

Related U.S. Application Data

(63) Continuation-in-part of application No. 10/665,985, filed on Sep. 19, 2003, now abandoned.

(51) Int. Cl.
*G06F 9/455* (2006.01)
(52) U.S. Cl. .................. 703/24; 714/703; 370/245; 717/124
(58) Field of Classification Search .................. 703/24
See application file for complete search history.

(56) References Cited

U.S. PATENT DOCUMENTS

| | | | | |
|---|---|---|---|---|
| 4,718,064 A | * | 1/1988 | Edwards et al. ............... 714/28 |
| 5,737,517 A | * | 4/1998 | Kite et al. ...................... 714/38 |
| 5,822,520 A | * | 10/1998 | Parker ......................... 709/230 |
| 5,864,658 A | * | 1/1999 | Theobald ..................... 714/25 |
| 6,321,347 B1 | * | 11/2001 | Beeker et al. ................. 714/28 |
| 6,539,503 B1 | * | 3/2003 | Walker ......................... 714/703 |
| 6,560,720 B1 | * | 5/2003 | Chirashnya et al. ........... 714/32 |
| 6,697,751 B2 | * | 2/2004 | Skingsley et al. ............ 702/108 |
| 6,862,564 B1 | * | 3/2005 | Shue et al. ..................... 703/25 |
| 7,013,482 B1 | * | 3/2006 | Krumel ....................... 726/13 |
| 7,017,148 B2 | * | 3/2006 | Kumar ........................ 717/114 |
| 7,130,895 B2 | * | 10/2006 | Zintel et al. .................. 709/220 |
| 7,213,061 B1 | * | 5/2007 | Hite et al .................... 709/223 |
| 2002/0169591 A1 | | 11/2002 | Ryzl | |

FOREIGN PATENT DOCUMENTS

JP        2002232516        8/2002

OTHER PUBLICATIONS

Kim et al, "Design and Implementation of Home Network Systems Using UPnP Middleware for Networked Appliances", IEEE Transactions on Consumer Electronics, vol. 48, Issue 4,.Nov. 2002, pp. 963-972.*

(Continued)

*Primary Examiner*—Paul L Rodriguez
*Assistant Examiner*—Mary C Jacob
(74) *Attorney, Agent, or Firm*—Klarquist Sparkman, LLP

(57) ABSTRACT

The generic device emulator provides an operational emulation of the behavior of any desired device within a device connectivity or other communications protocol as specified in a description of the respective device. This facilitates development and implementation of devices within a device connectivity architecture based on the protocol, since the user has only to define the description of the device. The generic device emulator provides default behaviors for a set of capabilities defined in the description for the device, which can be over-ridden or augmented by user-provided implementation of specific behavior for a capability. The generic device emulator also permits the user to inject defect behaviors, such as to introduce defects in the device's implementation of the protocol.

13 Claims, 4 Drawing Sheets

OTHER PUBLICATIONS

Dugan et al, "Design of Interfaces for Power Systems Analysis Components", Power Engineering Society Summer Meeting, vol. 2, 18-22, pp. 852-857, Jul. 1999.*

Kastner et al, "How Dynamic Networks Work: A Short Tutorial on Spontaneous Networks", Proceedings of the 8th International IEEE Conference on Emerging Technologies and Factory Automation, vol. 1, pp. 295-303, Oct. 15-18, 2001.*

Huck et al, "I/O Device Emulation in the Stanford Emulation Laboratory", Proceedings of the 12th Annual Workshop on Microprogramming, pp. 101-108, 1979.*

UPnP Implementers Corporation, "UPnP Device Certification Process Document", Version 1.0, 2001.*

Microsoft, "Understanding UPnP™: A White Paper" (2000), available at http://www.upnp.org/download/UPNP_UnderstandingUPNP.doc.

Lawrence (Globespan Virata), "Basic:1.0 Device Definition Version 1.0" (Dec. 12, 2002), © Contributing Members of the UPnP™ Forum, available at http://www.upnp.org/standardizeddcps/documents/BasicDevice-1.0.pdf.

Allegro, "RornPlug Embedded UPnP™ Technology Toolkits," available at http://www.allegrosoft.com/romplug.html.

Atinav, "Integrated Networking Technology Tools that Add Compatibility and Communication Connectivity to Heterogeneous Devices and Services" (Apr. 2002), available at http://www.atinav.com/UPnp/upnp_pdf.pdf.

Intel Corporation, "Intel Development Tools for Implementing UpnP* Devices" (Mar. 10, 2003), available at ftp://download.intel.com/technology/UPnP/download/authtoolpaper_q103.pdf.

Linux SDK for UPnP Devices 1.2.1, An Open Source UPnP Development Kit, available at http://upnp.sourceforge.net/.

* cited by examiner

Generic Emulator Software 780

GENERIC EMULATOR OF DEVICES IN A DEVICE COMMUNICATIONS PROTOCOL

CROSS REFERENCE TO RELATED APPLICATIONS

This is a continuation-in-part of U.S. patent application Ser. No. 10/665,985, filed Sep. 19, 2003, now abandoned.

TECHNICAL FIELD

The invention relates generally to software emulation of devices, and more particularly to emulation of devices in a communications protocol.

BACKGROUND

Software emulation of a device can be useful for a variety of purposes including prototyping and testing of devices that are in development. Software emulation can be particularly useful to developing devices for use in a communications protocol, so as to prototype and test interaction of a developing design for a device with other devices in the communications protocol.

One example of a communications protocol where software emulation of devices can play a role in device development is the Universal Plug and Play (UPnP™) device connectivity architecture, which provides a suite of communications or networking protocols for addressing, discovery, description, control, presentation and eventing. Universal Plug and Play (UpnP™) is an architecture for pervasive peer-to-peer network connectivity of intelligent appliances, wireless devices, and personal computers (PCs) of all form factors. (See, e.g., "Universal Plug and Play Device Architecture, Version 1.0," Microsoft Corporation (Jun. 2000).) UPnP™ is designed to bring easy-to-use, flexible, standards-based connectivity to ad-hoc or unmanaged networks whether in the home, in a small business, public spaces, or attached to the Internet. UPnP™ is a distributed, open networking architecture that leverages TCP/IP and various other Internet/Web technologies to enable seamless proximity networking in addition to control and data transfer among networked devices in the home, office, and public spaces. The UPnP™ architecture supports zero-configuration networking and automatic discovery whereby a device can dynamically join a network, obtain an IP address, announce its name, convey its capabilities upon request, and learn about the presence and capabilities of other devices and services.

In UPnP™, devices convey their capabilities by providing a description. The UPnP™ description for a device is partitioned into two, logical parts: a device description describing the physical and logical containers, and one or more service descriptions describing the capabilities exposed by the device. Other devices (termed "control points") that receive this description can send commands to access the capabilities of the device described in this description, and thereby control the device.

UPnP™ device and service descriptions are written by a device vendor or manufacturer. The descriptions are in XML syntax and are usually based on a standard UPnP™ Device Template and a standard UPnP™ Service Template. The standard templates are produced by a UPnP™ Forum working committee; they derive the template from the UPnP™ Template Language, which was derived from standard constructions in XML.

UPnP™ vendors can differentiate their devices by extending services, including additional UPnP™ services, or embedding additional devices. When a control point retrieves a particular device's description, these added features are exposed to the control point for control and eventing. The device and service descriptions authoritatively document the implementation of the device.

UPnP™ vendors that desire to have a particular device or service description approved as a standard, must go through the standardization process of the UPnP™ Implementers Corporation (UIC). Among other requirements, the standardization process includes obtaining four sample device implementations that conform to the description and should pass the UPnP™ Certification Test Tool.

Software emulation can be useful in this context to allow the vendors to more rapidly prototype and test device implementations for a proposed standard device or service description, before committing the implementation to hardware (e.g., by "burning" the software code for the device into the hardware).

Another useful application for software emulation relating to UPnP™ is in the development of control points. In the UPnP™ architecture, a control point is a device that operates as a controller of other devices. The control point obtains the description from a controlled device and uses the UPnP™ control protocols to invoke the capabilities exposed by the device (and described in the device's service descriptions). In developing a control point, it is useful to test that the control point interacts properly with a variety of different controlled devices, and remains robust in the presence of defective devices.

A conventional software emulation of a device is a device-specific emulation, which is purpose-built to emulate the specific device. Such conventional specific-device software emulations have drawbacks in the above-discussed context of developing implementations of descriptions to be proposed as a standard, and in testing control points.

In the context of developing implementations of a UPnP™ description to be proposed as a standard, there is a need among the device vendors to create software emulation of the devices. When a device standard is defined, it takes quite some time to get at least four implementations of the standard in place. Four implementations are necessary for the device specification to be presented for review with the UPnP™ Implementers Corporation (UIC). Further, vendors often lack expertise with the SOAP, HTTP and other protocol layers required of a UPnP™ device. From experience in certifying these devices, the UPnP™ Certification Test Tool team at Microsoft Corporation has discovered that most of the problems that vendors encounter are in parsing and creating the SOAP and HTTP packets, which are open standards. Vendors therefore have difficulty building software emulations to provide the device implementations corresponding to a UPnP™ description that are required to submit the UPnP™ description to the UIC.

In the context of testing control points, the control point is desirably tested with as large a number and variety of UPnP™ devices as possible. However, the number of devices (including software emulations of UPnP™ devices) currently available is limited. Moreover, the UPnP™ device emulations that are available typically are well formed devices (i.e., they are defect-free and correctly implement the UPnP™ protocols). Testing with such well-formed device emulations therefore may not enable the identification of failure conditions of the control points that occur in the presence of defects, such as devices with defective implementations of the UPnP™ communications protocol.

SUMMARY

A generic device emulator described herein has the capability to generically emulate devices based on a description of the respective device. The generic device emulator thus facilitates development of devices in the protocol. The device developer has only to define the description of the device and the services thereof. The generic device emulator then provides an operational emulation of the behavior of the device within a device connectivity or other communications protocol as specified in the description.

In emulating a device based on its description, the generic device emulator provides default behaviors for a set of capabilities defined in the description (e.g., for a set of actions defined in UPnP™ service descriptions for services of the device). The generic device emulator is extensible such that the default behaviors can be extended or over-ridden by providing an implementation of specific behavior for a capability (such as a specific implementation of an action in a UPnP™ Device description). The device developer therefore need not provide specific behavior implementations of the device's capabilities, and the generic device emulator still provides an emulation of the device operating within the protocol meeting the device's definition. Further, the device developer can provide specific behavior implementations of none, some or all of the device's capabilities, as desired. The generic device emulator then emulates the device operating within the protocol with as many specifically implemented behaviors of the device's capabilities as the device developer has provided. The generic device emulator supplies the default behavior of those capabilities for which no specific behavior implementation is provided.

The generic device emulator also supports add-in defect filters, which allow the device developer to introduce defects in the device's implementation of the protocol, or other defective device behaviors.

Additional features and advantages of the invention will be made apparent from the following detailed description of embodiments that proceeds with reference to the accompanying drawings.

DETAILED DESCRIPTION

The following description is directed to a generic device emulator in device connectivity or other communications protocols. An exemplary application of the generic device emulator is in a network environment of devices using a version of the Universal Plug and Play (UPnP™) peer device networking protocol (e.g., as a replacement for the SSDP discovery protocol used in UPnP™, version 1). UPnP™ is described in more detail in "Universal Plug and Play Device Architecture, version 1.0," Microsoft Corporation, Jun. 8, 2000; and "UPnP™ Device Architecture 1.0, version 1.0.1," UPnP™ Forum, May 6 2003. However, the generic device emulator is not limited in application to use with UPnP™, and can be adapted or applied for emulation of devices in other device connectivity or communications protocols, other device connectivity architectures, other computing and networking environments, and other applications.

1. General Networked Device Architecture Overview

Figure 1:
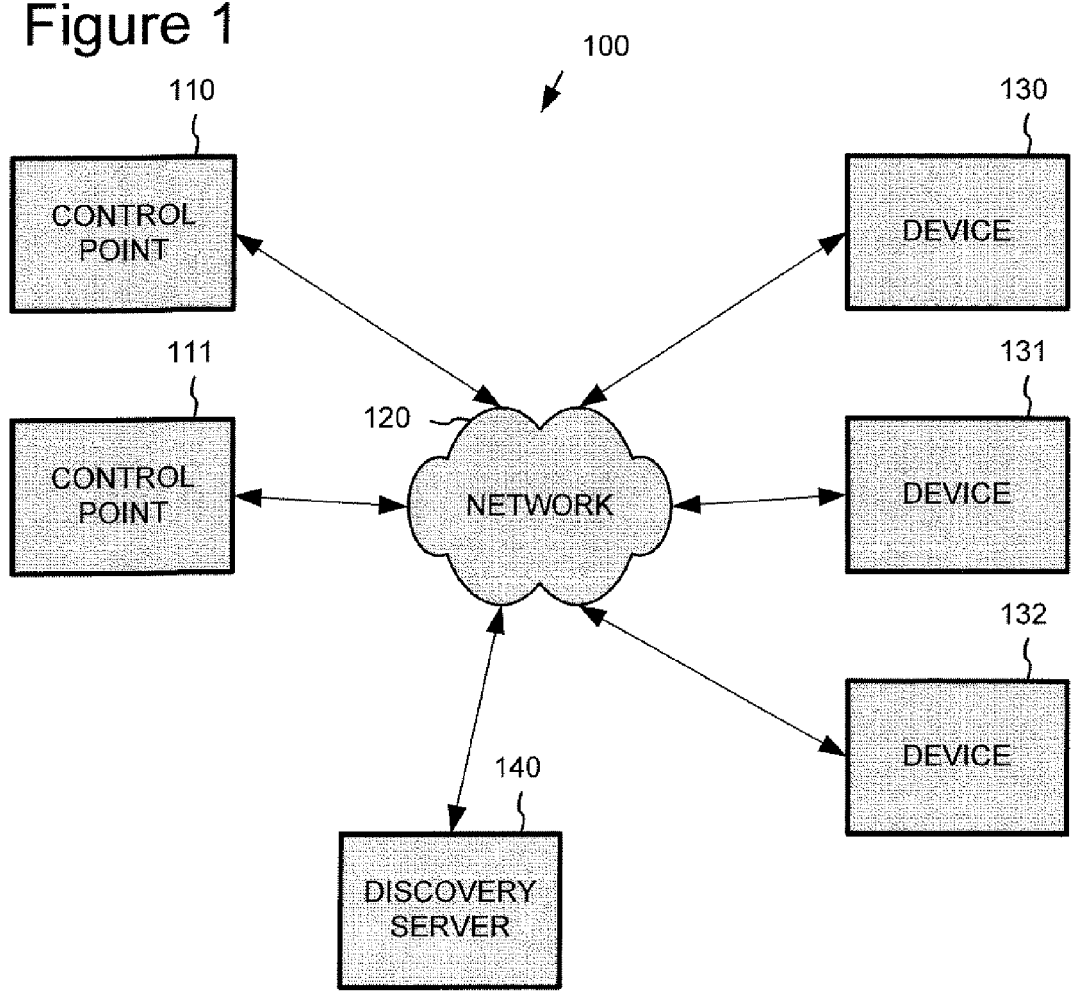
FIG. 1 is a block diagram of a network device connectivity architecture in which a generic device emulator can be used.

FIG. 1 illustrates a network architecture 100 in which the generic device emulator can be used. This network architecture 100 can be an arrangement of UPnP™-compliant networked computing devices. As described for example in "UPnP™ Device Architecture 1.0, version 1.0.1," UPnP™ Forum, May 6, 2003, the UPnP™ device architecture involves two types of actors: devices, hosting UPnP™-compliant services; and control points (or more simply controllers), who control the use of the services. The UPnP™ protocol lets controllers discover the devices and services hosted on the devices. Further, there are also occasions in which connectivity between the devices is a server-based operation.

In UPnP™, the network architecture 100 generally engages three kinds of actors:

UPnP™ Devices 130-132, usually devices and services on devices, but possibly controllers.

Control points or controllers 110-111.

And, optionally discovery servers 140.

Devices

A UPnP™ device is a container of services and nested devices. For instance, a VCR device may consist of a tape transport service, a tuner service, and a clock service. A TV/VCR combo device would consist not just of services, but a nested device as well.

Different categories of UPnP™ devices will be associated with different sets of services and embedded devices. For instance, services within a VCR will be different than those within a printer. Consequently, different working groups will standardize on the set of services that a particular device type will provide. All of this information is captured in an XML device description document and services descriptions that the device must host. In addition to the set of services, the device description also lists the properties (such as device name and icons) associated with the device.

Services

The smallest unit of control in a UPnP™ network is a service. A service exposes actions and models its state with state variables. For instance, a clock service could be modeled as having a state variable, current_time, which defines the state of the clock, and two actions, set_time and get_time, which allow you to control the service. Similar to the device description, this information is part of an XML service description standardized by the UPnP™ forum. A pointer (URL) to these service descriptions is contained within the device description document. Devices may contain multiple services.

A service in a UPnP™ device consists of a state table, a control server and an event server. The state table models the state of the service through state variables and updates them when the state changes. The control server receives action requests (such as set_time), executes them, updates the state table and returns responses. The event server publishes events to interested subscribers anytime the state of the service changes. For instance, the fire alarm service would send an event to interested subscribers when its state changes to "ringing."

Control Points

A control point in a UPnP™ network is a controller capable of discovering and controlling other devices. After discovery, a control point could:

Retrieve the device description and get a list of associated services.

Retrieve service descriptions for interesting services.

Invoke actions to control the service.

Subscribe to the service's event source. Anytime the state of the service changes, the event server will send an event to the control point.

These actors are networked via a network 120 or networks, such as network wiring (e.g., for an Ethernet or other local area network (LAN), a home phone line or power line network, a Firewire (IEEE 1394), universal serial bus (USB), or etc.), fiber optic cabling, wireless transceivers (e.g., for a Bluetooth, Wi-Fi (IEEE 801.11b), or other wireless data network) or the like. The network 120 can encompass a personal area network of devices carried by or worn on a person, a local area network of devices in a locale, or a wide area network (such as the Internet or other geographically dispersed data network).

The control points 110-111 and devices 130-132 can be any variety of device with embedded computing and networking capabilities, including without limitation audio/video or other multimedia recording/transmitting/receiving/or presenting device (broadcast receivers, televisions, video players, cameras, etc.), computers (personal, workstation, server, handheld, laptop, tablet, or other mobile), telephones, office equipment (printers, copiers, scanners, fax), security systems, home appliances (lighting, heating, ventilation, air conditioning, door openers, kitchen appliances, etc.), as a few general examples.

The control points 110-111 and devices 130-132 each implement the UPnP™ device connectivity protocol. They include networking protocol stacks for communicating over the network 120 with other network actors. They also include network interfaces for interfacing with the network 120. In general, the network interfaces are the physical or hardware interfaces to the networks, such as a network interface card (NIC) or adapter for physically interfacing with the network media. The devices also can include various logical interfaces provided over a physical network interface, such as a virtual private network (VPN), unicast, Point-To-Point Tunneling Protocol (PPTP) on a single NIC.

Although illustrated as having a single discovery server 140, the environment 100 can include multiple discovery servers (e.g., discovery servers with divided responsibility over different scopes of discovery responders in the environment).

2. Device Connectivity Protocol Overview

UPnP™ is based on a number of existing, standard protocols, including Transport Control Protocol/Internet Protocol (TCP/IP), Hypertext Transfer Protocol(HTTP), HTTP Multicast over UDP (HTTPU), HTTP Unicast over UDP (HTTPMU), Simple Service Discovery Protocol (SSDP), Generic Event Notification Architecture (GENA), Simple Object Access Protocol (SOAP), and Extensible Markup Language (XML). UPnP™ Devices use these protocols to provide peer device connectivity through the following steps.

Steps Involved in UPnP™ Networking

Addressing

Discovery

Description

Control

Eventing

Presentation

Addressing

The foundation for UPnP™ networking is the TCP/IP protocol suite and the key to this suite is addressing. Each device must have a Dynamic Host Configuration Protocol (DHCP) client and search for a DHCP server when the device is first connected to the network. If a DHCP server is available, the device must use the IP address assigned to it. If no DHCP server is available, the device must use Auto IP to get an address.

In brief, Auto IP defines how a device intelligently chooses an IP address from a set of reserved private addresses, and is able to move easily between managed and unmanaged networks.

A device may implement higher layer protocols outside of UPnP™ that use friendly names for devices. In these cases, it becomes necessary to resolve friendly host (device) names to IP address. Domain Name Services (DNS) are usually used for this. A device that requires or uses this functionality may include a DNS client and may support dynamic DNS registration for its own name to address mapping.

Discovery

Once devices are attached to the network and addressed appropriately, discovery can take place. Discovery is handled by the SSDP as discussed earlier. When a device is added to the network, SSDP allows that device to advertise its services to control points on the network. When a control point is added to the network, SSDP allows that control point to search for devices of interest on the network.

The fundamental exchange in both cases is a discovery message containing a few, essential specifics about the device or one of its services, for example its type, identifier, and a pointer to its XML device description document.

Description

The next step in UPnP™ networking is description. After a control point has discovered a device, the control point still knows very little about the device. For the control point to learn more about the device and its capabilities, or to interact with the device, the control point must retrieve the device's description from the URL provided by the device in the discovery message.

Devices may contain other, logical devices and services. The UPnP™ description for a device is expressed in XML and includes vendor-specific, manufacturer information including the model name and number, serial number, manufacturer name, URLs to vendor-specific Web sites, and so forth. The description also includes a list of any embedded devices or services, as well as URLs for control, eventing, and presentation.

Control

After a control point has retrieved a description of the device, the control point has the essentials for device control. To learn more about the service, a control point must retrieve a detailed UPnP™ description for each service. The description for a service is also expressed in XML and includes a list of the commands, or actions, the service responds to, and parameters or arguments, for each action. The description for a service also includes a list of variables; these variables model the state of the service at run time, and are described in terms of their data type, range, and event characteristics.

To control a device, a control point sends an action request to a device's service. To do this, a control point sends a suitable control message to the control URL for the service (provided in the device description). Control messages are also expressed in XML using SOAP.

In response to the control message, the service returns action specific values or fault codes.

Eventing

A UPnP™ description for a service includes a list of actions the service responds to and a list of variables that model the state of the service at run time. The service publishes updates when these variables change, and a control point may subscribe to receive this information.

The service publishes updates by sending event messages. Event messages contain the names of one of more state variables and the current value of those variables. These messages are also expressed in XML and formatted using GENA.

A special initial event message is sent when a control point first subscribes; this event message contains the names and values for all evented variables and allows the subscriber to initialize its model of the state of the service.

To support multiple control points, all subscribers are sent all event messages, subscribers receive event messages for all evented variables, and event messages are sent no matter why the state variable changed (in response to an action request or due to a state change).

Presentation

If a device has a URL for presentation, then the control point can retrieve a page from this URL, load the page into a browser, and depending on the capabilities of the page, allow a user to control the device and/or view device status. The degree to which each of these can be accomplished depends on the specific capabilities of the presentation page and device.

Device and Service Descriptions

The UPnP™ description for a device is partitioned into two, logical parts: a device description describing the physical and logical containers, and service descriptions describing the capabilities exposed by the device. A UPnP™ device description includes vendor-specific, manufacturer information like the model name and number, serial number, manufacturer name, URLs to vendor-specific Web sites, etc. (details below). For each service included in the device, the device description lists the service type, name, a URL for a service description, a URL for control, and a URL for eventing. A device description also includes a description of all embedded devices and a URL for presentation of the aggregate. This section explains UPnP™ device descriptions, and the sections on Control, Eventing, and Presentation explain how URLs for control, eventing, and presentation are used, respectively.

Note that a single physical device may include multiple logical devices. Multiple logical devices can be modeled as a single root device with embedded devices (and services) or as multiple root devices (perhaps with no embedded devices). In the former case, there is one UPnP™ device description for the root device, and that device description contains a description for all embedded devices. In the latter case, there are multiple UPnP™ device descriptions, one for each root device.

A UPnP™ device description is written by a UPnP™ vendor. The description is in XML syntax and is usually based on a standard UPnP™ Device Template. A UPnP™ Device Template is produced by a UPnP™ Forum working committee; they derive the template from the UPnP™ Template Language, which was derived from standard constructions in XML.

A UPnP™ service description includes a list of commands, or actions, the service responds to, and parameters, or arguments, for each action. A service description also includes a list of variables. These variables model the state of the service at run time, and are described in terms of their data type, range, and event characteristics.

Like a UPnP™ device description, a UPnP™ service description is written by a UPnP™ vendor. The description is in XML syntax and is usually based on a standard UPnP™ Service Template. A UPnP™ Service Template is produced by a UPnP™ Forum working committee; they derived the template from the UPnP™ Template Language, augmenting it with human language where necessary. The UPnP™ Template Language is derived from standard constructions in XML.

UPnP™ vendors can differentiate their devices by extending services, including additional UPnP™ services, or embedding additional devices. When a control point retrieves a particular device's description, these added features are exposed to the control point for control and eventing. The device and service descriptions authoritatively document the implementation of the device.

For further details of the UPnP™ device connectivity architecture, associated protocols, and UPnP™ descriptions, see "Universal Plug and Play Device Architecture, version 1.0," Microsoft Corporation, Jun. 8, 2000; and "UPnP™ Device Architecture 1.0, version 1.0.1," UPnP™ Forum, May 6, 2003.

3. Generic Device Emulator Overview

Figure 2:
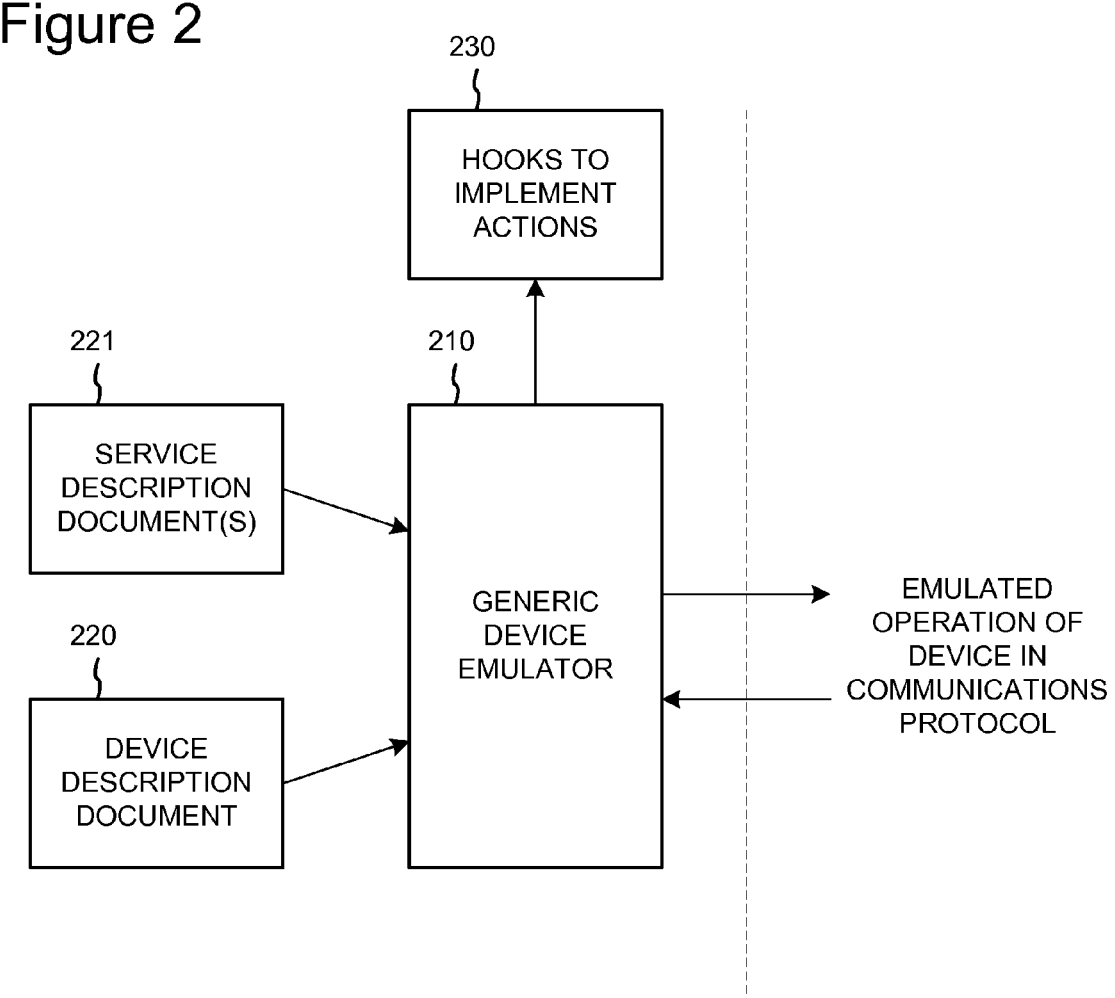
FIG. 2 is an overview block diagram of a generic device emulator of a device in a networked device connectivity architecture, such as shown in FIG. 1.

With reference now to FIG. 2, the generic device emulator 210 emulates the operation of an emulated device (e.g., devices 130-132) within the network architecture 100 (FIG. 1) of UPnP™, including the behavior of the emulated device during Addressing, Discovery, Description, Control and Eventing phases of UPnP™. In other words, the generic device emulator effectively provides an implementation of the emulated device as it would operate within the UPnP™ protocol. The emulated device can be any device that can operate in the UPnP™ architecture (i.e., any UPnP™-compliant device). Alternative embodiments of the generic device emulator for other device connectivity or communication protocols can provide generic emulation of devices for such protocols.

The generic device emulator 210 emulates the behaviors of the emulated device within UPnP™ based on the UPnP™ description of the device (e.g., the device description document (DDD) 220 and service description document(s) (SCPD) 221 in the UPnP™ description of the device). Given the device and service descriptions 220-221 of any UPnP™ device, the generic device emulator 210 emulates behaviors implementing the description within UPnP™. More particularly, the generic device emulator 210 sends and responds to messages to establish the device's address in the addressing phase of UPnP™. The generic device emulator 210 sends device announcements and responds to discovery requests matching the device characteristics specified in the device and service description documents 220-221. During the description phase, the generic device emulator 210 responds to description requests by providing the description of the device and its services.

In the control phase, the generic device emulator 210 implements default behaviors for the actions specified in the emulated device's service description document(s) 221. The generic device emulator 210 receives action invocation messages (SOAP commands) from control points and validates these messages against the emulated device's service description. Upon validation, the generic device emulator 210 provides a default response to the action invocation, which response conforms to the data format and types specified in the service description for the action. For example, if the response to the action specified in the service description is to return an integer value, the default behavior simply returns a default integer value (e.g., a zero).

The generic device emulator 210 further includes hooks (i.e., interfaces) 230 for add-on or plug-in implementations of specific actions (user-specified action implementations) that over-ride the default behavior. This allows the user (e.g., a device vendor) to provide state-dependent, action-specific behaviors. For example, a print action defined in the service description of a printer device may specify returning an integer, which is to represent a current count of print jobs (i.e., a state-dependent value). The user can provide an implementation of this action-specific behavior to return a value dependent on the device's state, rather than the default behavior that simply returns a default integer value.

Accordingly, upon validating an action invocation, the generic device emulator 210 first checks for a specific implementation of the invoked action. If an implementation of the action is present, the generic device emulator 210 invokes the user-specified action implementation. Otherwise, the generic device emulator 210 performs the default behavior based on the description of the action response in the service description. User specified action implementations can be provided for some, all or none of the actions specified in the service description documents 221 of the device. The generic device emulator 210 simply invokes a user-specified action implementation if one has been added, and otherwise performs the default behavior based on the specified response format and types.

For eventing, the generic device emulator 210 generates state change event messages to send to the network upon changes in device state. For the presentation phase, the generic device emulator 210 receives and validates presentation requests, and responds to valid presentation requests by sending the presentation data as specified in the service and device description documents 220-221.

The generic device emulator 210 further provides a mechanism (described more fully below) for the vendor to define defective behaviors, which can be useful for testing control points 110-111 (FIG. 1). The defective behaviors are defined using XML format statements in a textual configuration file, which describe defect filters to be applied to the messages generated by the generic device emulator for the emulated device. For example, a defect filter can be defined to have the generic device emulator 210 strip off a leading '*' character from headers of SOAP messages sent for the emulated device.

The generic device emulator 210 thus provides emulation of any device in the UPnP™ protocol, based on no more than the UPnP™ description of the device. A vendor can therefore produce an implementation of a UPnP™ description to propose for standardization, with no further work than defining the UPnP™ description itself and without having to individually implement the various protocols involved in UPnP™ (e.g., HTTP, SOAP and SSDP) for the specific device. Further, the vendor can easily add implementations of specific actions to over-ride default behaviors, such as to provide state-dependent action responses. Further, the vendor can provide defect filters to introduce defective behaviors, such as for testing purposes.

4. Generic Device Emulator Architecture

Figure 3:
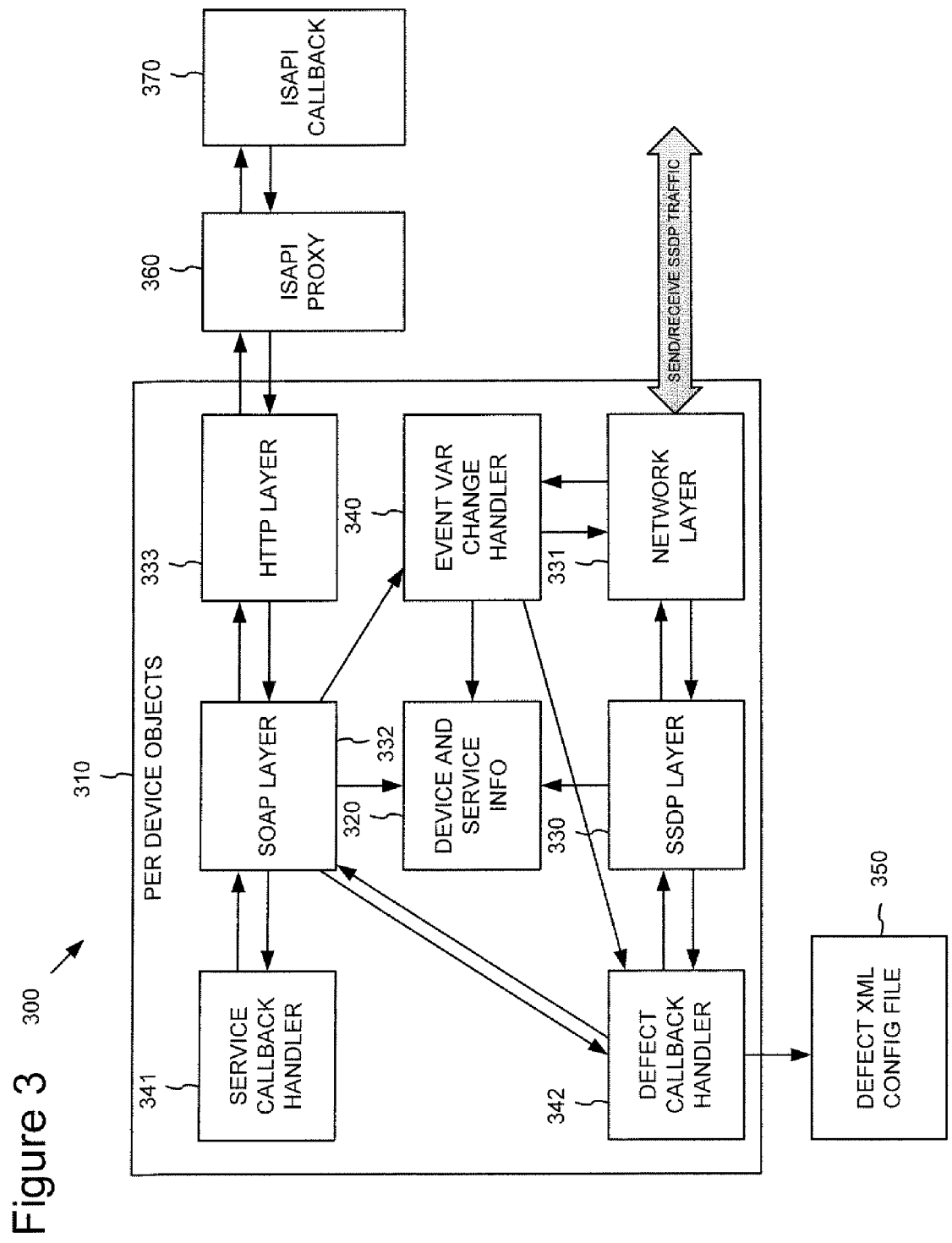
FIG. 3 is a block diagram of a component architecture of the generic device emulator of FIG. 2.

With reference now to FIG. 3, the generic device emulator 210 (FIG. 2) has a software architecture or device framework 300 structured into two parts: a set of objects 310 that is created per emulated device instance, and a set of objects 360, 370 created per machine in which the device is emulated. The objects 310 created per device include: a Device and Service Info object 320, an Event Variable Change Handler 340, an SSDP Layer 330, a Network Layer 331, a SOAP Layer 332, a HTTP Layer 333, a Service Callback Handler 341 and a Defect Callback Handle 342. The objects created per machine include an ISAPI Proxy 360, and an ISAPI Callback 370. The software architecture runs on the Microsoft Internet Information Server (IIS) web server platform on a computer.

ISAPI Callback

The ISAPI callback 370 includes a set of methods that is used for invoking actions of the emulated device(s) on the generic device emulator. These methods are implemented in a dynamic link library (DLL), and written as an Internet Services Application Programming Interface (ISAPI) extension of the Microsoft Internet Information Server web server platform. This provides a mechanism for receiving action requests from control points 110-111 over the network 120 (FIG. 1). The action requests are HTTP calls (such as from the control points), and are received by IIS and is then forward to the ISAPI control DLL to be communicated to the device being emulated by the generic device emulator. The ISAPI control DLL writes the request to a block of shared memory and invokes the device to read the shared memory.

ISAPI Proxy

When an action request is received by the ISAPI Callback 370, the ISAPI Callback writes the action request to a portion of shared memory and sets an event for the emulated device to read the shared memory. This shared memory is the only way of communication between the device and the ISAPI Control running in different processes. But when multiple devices are running in the machine, the ISAPI Proxy 360 is needed to synchronize the access to the Shared Memory. The ISAPI Proxy 360 is implemented as a COM object that sits in-between the ISAPI Control DLL 370 and the device to synchronize the access to the Shared Memory. When emulation of a device by the generic device emulator is started the device registers itself with the Proxy using a GUID, stating that every request to that device contains that GUID in its destination URL. The Proxy 360 then reads the Shared Memory and looks up the map of all registered devices and forwards the request to the correct emulated device.

Device and Service Info

Once a device description document 220 is given to the emulator 210, the device info and all the service info are parsed and are maintained by the Device and Service Info object 320. The object 320 provides methods by which the other components of the emulator can get information about the device and its services.

Event Variable Change Handler

The Event Variable Change Handler object 340 is responsible for enabling control points to subscribe and unsubscribe for event handles. It maintains a list of all subscribed control points. It monitors the state variables and when an action changes the event variables it sends out event messages for all the subscribing control points.

SSDP Layer

The SSDP layer object 330 is responsible for sending the NOTIFY alive messages, respond to Discovery messages and send ByeBye messages when the device is being shutdown.

Network Layer

The Network Layer object 331 provides a set of classes to create Internet Protocol version 4 (IPv4) and Internet Protocol version 6 (IPv6) sockets. The SSDP layer object 330 and Event Variable Change Handler object 340 register methods with the Network Layer so they can get called when the appropriate message comes in. For example, once the Network Layer receives a Discovery message for a device or service, the Network Layer object kicks off the SSDP thread that waits for this event. Also the SSDP and Event handler use the Network Layer to send messages over the Network.

HTTP Layer

When a call is received from the ISAPI Proxy 360, the Http layer object 333 reads the Shared Memory and parses the HTTP headers and extracts the SOAP body. It forwards the SOAP body to the SOAP layer object 332 for validation and processing. It is also responsible for sending HTTP action responses.

SOAP Layer

The SOAP layer object 332 parses the SOAP request packets and validates the action request. It then checks with the Service Callback Handler object 341 to see if the action is implemented by the user (i.e., the action-specific implementation added via action hooks interface 230 discussed above). If not then it looks at the Service Description information 221 (contained in the Device and Service Info object 320) for that action and performs a default action, according to the action response structure and types specified in the service description. More information about the default action is further described below. The SOAP layer object 332 checks with the Event Change handler object 340 about any event variables that changed. If there are any changes, the event changes are sent by the Event Change Handler object 340. Once the action is executed, the SOAP layer object constructs the SOAP response and then sends it out using the HTTP Layer object 333.

Service Callback Handler

The user of the generic device emulator 210 can either chose to use the default action response that the SOAP Layer object 332 does or can implement the actions by themselves. If the user chooses to implement the action, the user implements a method and puts an entry to reference this method into the Service Callback Handler. Every time an Action request is received by the SOAP layer object 332, the SOAP layer object consults with the Service Callback Handler object 341 to check if the callback is implemented.

Defect Callback Handler

All the packets before being sent out on the socket are consulted with the Defect Callback Handler object 342. The user can implement methods to inject a defect or defects into the packets. This feature is extremely useful in testing control points. Each method will inject a defect or defects into a particular message type. The user creates a defect behavior type by specifying a set of such methods using the defect configuration file 350. More information on specifying the defect types is detailed below. If no defect behavior is specified, the generic device emulator will emulate a perfect working device that is compliant with the UPnP™ Architecture 100.

5. Using the Generic Device Emulator

Device Framework

The device framework 300 (FIG. 3) provides hooks 230 (FIG. 2) which the user can use to add action implementations for the emulated device, initialize the state variables of the device and add defect behaviors. These allow the user to augment or modify the default behaviors provided in the generic device emulator by incorporating methods to implement specific actions, state variable initialization and defect behaviors, which are then compiled with the source code of the generic device emulator to produce the emulation of the desired device or devices in the UPnP™ architecture. The following description details the steps for a user to add such methods in one embodiment of the generic device emulator. Alternative embodiments of the generic device emulator can provide other interfaces and mechanisms to add this user-provided method implementations to over-ride or augment default action and state initialization behaviors, as well as injecting defect behaviors.

Initializing State Variables

As the generic device emulator 210 (FIG. 2) scans through all the services in the Description Document 220, it checks to see if the user has provided a method to initialize all the state variables for that particular service. If a method is not provided, the generic device emulator falls back to a default implementation. When the user wants to provide the user's own method for state variable initialization in the illustrated embodiment of the generic device emulator, the user does the following.

1.) Write a new method with the following signature,

```
typedef void (*InitStateVariable)(
    Config::StateVarMap& stateVarMap
    ) throw ( );
```

It is recommended practice to name the user's method based on the Service Name and the Version number that this method is defined to serve. The parameter that is passed to the method is a map of all the State Variables of the user's service.

2.) add an entry in for the method in the source code of the generic device emulator. For example, if the service name is pwrdim and its version is 1, the entry may be (assuming the method is named PwrDim1 and is inside the StateVarInit namespace), StateVarEntry(pwrdim, 1, StateVarInit::PwrDim1)

If the user has not implemented a State Variable initialization method for the service, the generic device emulator defaults to the following, 1.) String data types are assigned the string "None".

2.) ui1, ui2, ui4, i1 and i2 are all assigned 0.

3.) uri data type are assigned the string http://dummy-value.

Alternative embodiments of the generic device emulator can provide defaults for fewer or more data types, as well as using different defaults for the data types. Further the default method GetDefaultVariableValue in the illustrated embodiment of the generic device emulator can be edited or modified by the user to add more data types.

Implementing Device Actions

When an Action is being invoked on the emulated device, the generic device emulator 210 (FIG. 2) checks if the user has provided a method that implements this action. If a method is not provided, the generic device emulator falls back to a default implementation. When the user wants to provide some implementation for an Action in the illustrated embodiment of the generic device emulator, the user does the following, 1.) Write a new method with the following signature,

```
typedef void (*ExecuteAction)(
    Config::StateVarMap& stateVarList,
    Config::InArgsMap& inArgs,
    Config::OutArgsMap& outArgs,
    Config::RetVal& retVal
    ) throw ( );
```

The first parameter is the Map of all the State Variables of the particular service. The second argument is a map of all the IN arguments. The third argument is the map of all the expected OUT arguments and the last is the structure that can hold a variable name and value that is treated as RetVal of the action.

2.) add an entry for this new method in the generic device emulator source code (e.g., in the actionExecutorEntries map in ActionExecutorMap.cpp in one embodiment of the generic device emulator). For example, if the user's action name is "PowerOn" and the user has named the user's method "PowerOn" inside the namespace "ActionExecutor," the user's entry would look like, ActionExecutorEntry(PowerOn, ActionExecutor::PowerOn)

If the user has not implemented an Action, the generic device emulator falls back to the following default implementation.

a) All the IN arguments are copied to the State Variable map based on the relatedStateVariable binding.
 b) All the OUT arguments and the RetVal are derived from the State Variable map based on the relatedStateVariable binding.

Alternative embodiments of the generic device emulator can provide a different default Action implementation.

Defective Behavior Framework

As discussed above, the generic device emulator 210 provides hooks 230 to add user-specified action implementations, which permits the user to build full (non-default) working implementations of the emulated device. This section will discuss methods by which defective packets can be injected into the UPnP™ conversation. After building a Packet to send out of the socket (a packet here can be a NOTIFY, M-Search Response, Action Response, Eventing Packet, Subscribe/Un-Subscribe Response packet), the generic device emulator gives a callback into the framework 300. This callback gives control back to a user-provided defective behavior method that can malform the packet and send it back to the generic device emulator, which the generic device emulator then sends out through the socket. The methods involved in implementing a user-provided defective behavior method is as follows, 1.) Implement a method with the following signature,
  typedefbool(*DefectiveAction)(Config::ResponsePackets& pkts) throw ( );

The argument to the method is a vector of all the packets that the generic device emulator is going to send out of the socket. (A vector of packets is needed because in the case of NOTIFY, there is more than one packet.) When the method returns false, the generic device emulator doesn't send the packet at all. The generic device emulator waits for this method to return so it can sleep inside the method and delay sending a packet, too. Since the generic device emulator always creates valid packets, implementing this method should be simple, without any need for complex parsing code. In the described embodiment of the generic device emulator, it is recommended that the method is placed inside the namespace "DefectBehavior" and under the directory "DefectBehavior."

2.) add an entry to reference this method in the generic device emulator (e.g., in the "defectBehaviorEntries" map in the generic device emulator's source code file, "DefectBehaviorMap.cpp"). If the user's method name is "NotifyNoAsterik" and is inside the namespace DefectBehavior, the user's entry may look like,
  DefectiveBehaviorEntry(Notify_No_Asterik, DefectBehavior::NotifyNoAsterik)

Here the string Notify_No_Asterik is a friendly name that the user assigns to the method.

Hosting the Generic Device Emulator

In the foregoing discussion, the main framework of the Emulator and the methods it depends on are described. This section discusses how an emulated device is hosted and a defect or defects are injected in the device.

Emulating a Device

1) To emulate any device, the user needs the Description document 220 and all the required service description documents 221. The user places these documents in directory locations on the computer running the generic device emulator, e.g., the description document in the web\Description directory, and the service description documents into the directory web\SCPD.

2) In the Description document 220, the user edits the "EventSubUR1," and "ControlUr1" fields to reference the ISAPI Callback 370 (FIG. 3), and adds the enclosing device's GUID to the URL so as to register with ISAPI Proxy 360 (FIG. 3). The user edits the "SCPDUr1" tag point to the directory location where the SCPD document is present.

3) The user implements the State Variable Initializer methods for all the services and the Actions methods of any actions, if desired.

The generic device emulator is now ready to emulate the device. In one embodiment, the executable of the generic device emulator ("DeviceEmulator.exe") takes in three command line arguments. The first argument is the Description document of the device. So to emulate the device, the user creates a virtual directory (e.g., "DeviceEmulator") in the user's IIS installation on the computer and makes it point to the web directory. The user enables running ISAPI extensions. Now from the Root Directory of the Device Emulator, the user types in the following on the command prompt, "Emulator\obj\i386\DeviceEmulator.exe http://localhost/DeviceEmualtor/Description/x10light.xml" to start emulating the device.

Inject Defect Behavior

As discussed above, the user can write a defect method to implement a defect behavior for the emulated device. The user injects or applies the defect behavior implemented by this method in the emulated device using a defect XML config file 350 (FIG. 3). The generic device emulator supports applying a Defect Behavior as explained below:

The generic device emulator has a set of methods that can malform a given set of packets. Some of these methods are very generic and can be applied to all packet types; some are very specific that can be applied only to a particular packet type; and some very specific that can be applied only to a type of packet from a device.

For the methods that are very specific to a particular packet, the generic device emulator organizes them under the type of packet they can actually malform.

For example, the user provides the methods "NotifyNoAsterisk," "NotifyMalformedNTS" and "SubscribeNoResponse." Further, all these methods friendly name are "Notify_No_Astrik," "Notify_Malformed_NTS" and "Subscribe_No_Response," respectively. The first two methods are specific to a NOTIFY packet and the third is specific to a Subscription Response packet.

A Defective Behavior of a device can be that its NOTIFY packets do not have an Asterisk or has the NTS header value malformed and it does not respond to a Subscription request. To describe this behavior in the defect configuration file 350, the user writes a new Behavior type as shown in the XML snippet below,

```
<DefectConfig>
  <DefectType>
    <Name>MyDefectType</Name>
    <Notify>
      <Name>Notify_No_Asterik</Name>
      <Name>Notify_Malformed_NTS</Name>
    </Notify>
      <Subscribe>
        <Name>Subscribe_No_Response</Name>
      </Subscribe>
```

```
        -continued
    </DefectType>
        .
        .
        .
    </DefectConfig>
```

Now in the Config file, the user has defined a new Defect Behavior MyDefectType that exactly describes the behavior the user wants. To apply the defect behavior to the emulated device, the generic device emulator takes the Defect Type as a second parameter. In this example, the user invokes the generic device emulator to emulate a "x10light" device with the new defect behavior by typing on the command prompt, "Emulator\obj\i386\DeviceEmulator.exe http://localhost/DeviceEmulator/Description/x10light.xml MyDefectType." In this case, the generic device emulator will Malform the first set of NOTIFY packets with the first method "NotifyNoAsterisk" and the second set of NOTIFY packet with the second method "NotifyMalformedNTS." This sequence alternates for every set of NOTIFY packet.

As a further example, the user might want to make this behavior random, and ask the framework to choose one among the available methods to malform that particular packet. To enable this, the user can pass an option third argument to the executable such as the following command line invocation, "Emulator\obj\i386\DeviceEmulator.exe http://localhost/DeviceEmualtor/Description/x10light.xml MyDefectType yes." In this case, the Emulator switches to a random mode and malforms a particular set of packets by picking any of the available methods.

5. Computing Environment

The above described generic device emulator 210 (FIG. 2) can be implemented on any of a variety of computing devices and environments, including computers of various form factors (personal, workstation, server, handheld, laptop, tablet, or other mobile), distributed computing networks, and Web services, as a few general examples. The generic device emulator can be implemented in hardware circuitry, as well as in software 780 executing within a computer or other computing environment, such as shown in FIG. 4.

Figure 4:
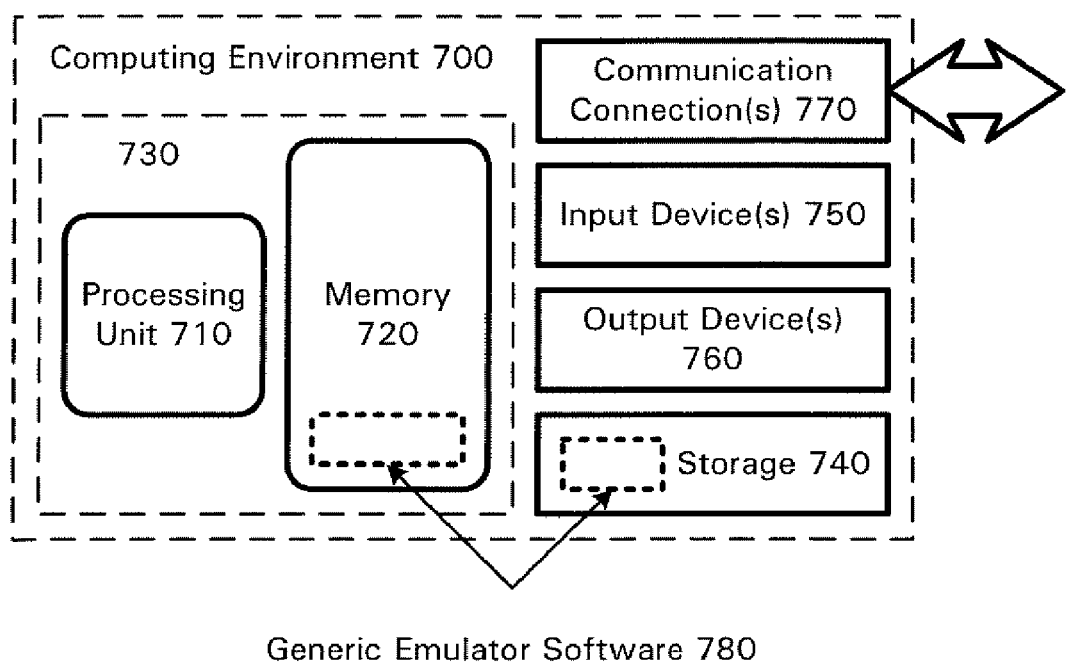
FIG. 4 is a block diagram of a suitable computing environment for implementing the generic device emulator of FIG. 2.

FIG. 4 illustrates a generalized example of a suitable computing environment 700 in which the described techniques can be implemented. The computing environment 700 is not intended to suggest any limitation as to scope of use or functionality of the invention, as the present invention may be implemented in diverse general-purpose or special-purpose computing environments.

With reference to FIG. 4, the computing environment 700 includes at least one processing unit 710 and memory 720. In FIG. 4, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. The memory 720 stores software 780 implementing the generic device emulator 210.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. The storage 740 stores instructions for the device connectivity and networking software 780.

The input device(s) 750 may be a touch input device such as a keyboard, mouse, pen, or trackball, a voice input device, a scanning device, or another device that provides input to the computing environment 700. For audio, the input device(s) 750 may be a sound card or similar device that accepts audio input in analog or digital form, or a CD-ROM reader that provides audio samples to the computing environment. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The generic device emulator herein can be described in the general context of computer-readable media. Computer-readable media are any available media that can be accessed within a computing environment. By way of example, and not limitation, with the computing environment 700, computer-readable media include memory 720, storage 740, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

I claim:

1. A method of generically emulating devices communicating through a device connectivity protocol, the method comprising:

processing, in a generic device emulator able to emulate more than one device based on device descriptions, a description of a device to be emulated in the device connectivity protocol, the description specifying a set of actions of the device to be emulated;

in response to receiving an action request from a control point at the device emulator per the device connectivity protocol, checking the action request against the device description in the device emulator to validate which action out of the set of actions specified in the description the action request matches;

upon validating an action to which the action request matches, producing, at the device emulator, a default response, the response based on the description such that, through the response the device emulator emulates operation of the device to be emulated;

reading a device defect configuration file representing at least one defect behavior to be applied to a type of packet transmitted as part of a message for the emulated device;

upon production of a valid packet for the emulated device, as part of a message, the valid packet being of a type for which a defect behavior is represented in the device defect configuration file, applying the defect behavior to the valid racket upon producing the racket to create an invalid packet for the emulated device; and transmitting the invalid packet for the emulated device as modified by applying the defect behavior.

2. The method of claim 1 wherein producing the default response comprises producing a response message containing a default value consistent with a data type specified for a return parameter of the action in the description.

3. The method of claim 1 wherein the validated action has a set of input and output parameters corresponding to state variables of the device to be emulated and wherein producing the default response comprises:

setting the corresponding state variables of the device to be emulated to values of the respective input parameters contained in the action request;

producing a response with output parameters set to values of the corresponding state variables of the device to be emulated; and producing an eventing message if the action modified any evented variables.

4. The method of claim 1 further comprising:

providing hooks to interface user-provided action response implementations, if any, for the set of actions;

upon validating the action request to match the action, first checking whether there is a user-provided action response implementation for the action; and producing the default response consistent with the description if there is no user-provided action response implementation, and otherwise performing the user-provided action response implementation for the action.

5. The method of claim 4 wherein the hooks interface user-provided action response implementations of at least one action out of the set of actions but not every action out of the set of actions.

6. The method of claim 1 wherein applying the defect behavior comprises invoking a user-provided implementation of the defect behavior.

7. A method of emulating devices communicating through a device connectivity protocol, the method comprising:

reading a device defect configuration file representing in a tagged text format at least one defect behavior to be applied to a type of packet transmitted as part of a message for a device emulated per the device connectivity protocol;

upon production of a valid packet for the emulated device, as part of a message, the valid packet being of a type for which a defect behavior is represented in the device defect configuration file, and before transmitting the valid packet, applying the defect behavior to the valid packet to create an invalid packet for the emulated device; and transmitting the invalid packet for the emulated device as modified by applying the defect behavior.

8. The method of claim 7 wherein applying the defect behavior comprises invoking a user-provided implementation of the defect behavior.

9. The method of claim 8 further comprising randomly applying a defect behavior out of a set of defect behaviors to messages produced to emulate the emulated device in the device connectivity protocol.

10. Computer-readable media having stored thereon a software framework of a generic device emulator, that when executed on a computer, provides emulation of an operation of a device within a device connectivity architecture consistent with a textual description of the device, wherein the description of the device specifies data formats of requests and responses for a set of actions that the device is capable of, the generic device emulator comprising:

program code for, within the generic device emulator, receiving action requests directed to the device from a control point within the device connectivity architecture;

program code for, within the generic device emulator, checking an action request, received from a control point, against the description to validate whether the action request matches that of an action specified in the description;

program code for, within the generic device emulator, performing a default behavior producing a response for the action consistent with the data format specified in the description, thereby emulating operation of the device for the action;

program code for reading a device defect configuration file representing in a tagged text format at least one defect behavior to be applied to a type of racket transmitted from the emulation of the device within the device connectivity architecture;

program code for applying the defect behavior to a packet upon producing the packet of a type for which a defect behavior is represented in the device defect configuration file; and program code for transmitting the packet as modified by applying the defect behavior.

11. The computer-readable media of claim 10 further comprising:

program code for providing hooks to interface user-provided action behavior implementations of one or more actions out of the set of actions; and program code for checking upon validating that an action request matches that of the action specified in the description whether a user-provided action behavior implementation is presently hooked for the action; and program code operating in a case that a user-provided action behavior implementation is presently hooked for the action to invoke the user-provided action behavior implementation in place of the default behavior.

12. The computer-readable media of claim 10 wherein performing the default behavior comprises producing a response message containing a default value consistent with the data format of the response specified for the action in the description.

13. The computer-readable media of claim 10 wherein the program code for performing the default behavior for the action in which the data format of the request and response has a set of input and output parameters corresponding to state variables of the device comprises:

program code for setting the corresponding state variables of the device to values of the respective input parameters contained in the action request; and program code for producing the response with output parameters set to values of the corresponding state variables of the device.

* * * * *

UNITED STATES PATENT AND TRADEMARK OFFICE
CERTIFICATE OF CORRECTION

PATENT NO. : 7,603,266 B2
APPLICATION NO. : 10/676350
DATED : October 13, 2009
INVENTOR(S) : Govindaraj Ramanathan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 667 days.

Signed and Sealed this

Fifth Day of October, 2010

David J. Kappos
*Director of the United States Patent and Trademark Office*